United States Patent

Charney

[15] 3,705,465
[45] Dec. 12, 1972

[54] FISH LURE

[72] Inventor: Andrew Charney, 20918 Botsford Drive, Farmington, Mich. 48024

[22] Filed: Jan. 11, 1971

[21] Appl. No.: 105,503

[52] U.S. Cl. ............... 43/42.06, 43/42.12, 43/42.31, 43/42.33, 43/42.35
[51] Int. Cl. ............................................. A01k 85/00
[58] Field of Search....43/42.06, 42.33, 42.35, 42.31, 43/42.12

[56] References Cited

UNITED STATES PATENTS

| | | | |
|---|---|---|---|
| 2,288,595 | 7/1942 | Peterson | 43/42.33 |
| 2,599,035 | 6/1952 | Wing | 43/42.33 |
| 1,608,375 | 11/1926 | Dewey | 43/42.35 X |
| 2,123,951 | 7/1938 | McArthur | 43/42.35 X |
| 2,752,721 | 7/1956 | Denny | 43/42.33 |
| 2,613,471 | 10/1952 | Traycik | 43/42.31 |
| 2,629,960 | 3/1953 | Baxter | 43/42.06 |
| 2,844,907 | 7/1958 | Merton | 43/44.99 |

Primary Examiner—Louis G. Mancene
Assistant Examiner—Daniel J. Leach
Attorney—McGlynn, Reising, Milton & Ethington

[57] ABSTRACT

A fish lure having an elongated hollow body of light refracting plastic material with smoothly curved sidewalls which terminate at one or both ends with an oblique face to provide a circle of emitted light. The surfaces of the body are also provided along the bottom thereof with a pair of ribs extending substantially the full length of the body with relatively narrow outwardly facing, light emitting surfaces disposed obliquely to the adjacent wall surfaces. Interiorly of the body is a rollable "knocker" ball, a spinner or a quantity of salmon eggs.

9 Claims, 5 Drawing Figures

PATENTED DEC 12 1972 3,705,465

INVENTOR.
Andrew Charney
BY
Barnard, McGlynn & Reising
ATTORNEYS

FISH LURE

Background Of The Invention

1. Field of the Invention

This invention relates to fish lures and particularly to those of the so-called plug type. A molded hollow body of light refracting material is employed having a novel configuration which concentrates the externally entering light by refracting and transmitting it for emission from selected obliquely formed surfaces with intensified brilliance, resulting in a plug body which has unusual attraction to a striking fish and yet can be manufactured at relatively low cost. Simple modifications of the basic design enable the incorporation within the body of either a loss motion type knocker element, rotatably driven spinners or trail emitting salmon eggs.

2. Description of the Prior Art

It has previously been proposed to utilize the broad principle of light refraction in plastic bodies of fish lures. Thus, in U.S. Pat. No. 2,241,941 to Bates, light refraction serves to accent the appearance of a dimpled surface in simulating fish scales and, in U.S. Pat. No. 2,641,080 to Wise, to magnify internal markings and colorings. I believe I am the first, however, to employ the principle in a manner which operates to efficiently collect and absorb the external light striking the body of the lure and then transmit it to a relatively few areas of confined width and selected location from whence the light, thus concentrated, is emitted from the body with greatly intensified brilliance. Also, others as represented by U.S. Pat. No. 2,629,960 to Baxter, U.S. Pat. No. 2,844,907 to Merton and U.S. Pat. No. 3,044,207 to Dorsett have suggested enclosing spinners, fish food and noise producing rollable balls, respectively, within the hollow body of a fish lure. The novel configuration of my lure body, however, not only has the advantage of being more easily adapted for incorporating such features but additionally enables its production to be accomplished at relatively low cost by simple and commonly used molding techniques.

More specifically, my invention is distinguished importantly from such prior devices in the use of a transparent plastic material body having a generally tubular form, the walls of which are generally smoothly curved so as to efficiently absorb the available extraneous light and transmit it by refraction to obliquely disposed and relatively narrow externally facing surfaces where it is emitted in concentrated or intensified rays. One of these surfaces extends substantially the full length of the lure body to provide a linear band of light, simulating a swimming fish. Also, the rear end of the body or the forward end, or both, may be similarly terminated with an oblique face to provide a circle of emitted light. As molded, the forward end of the body is left open, with provision for inserting a transverse disc therein somewhat rearwardly of the front end, thus obtaining a forwardly open front chamber within which water turbulence and dispersment of air bubbles occurs as the lure is drawn through the water.

These and other objects and advantages of my invention will be more clearly understood from the following description, having reference to the drawing wherein.

Figure 1:
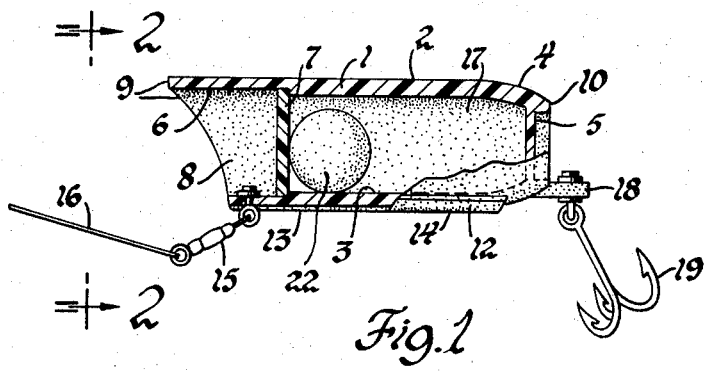
FIG. 1 is a view partly in longitudinal section and partly in side elevation showing a fish lure in accordance with the invention.
Figure 2:
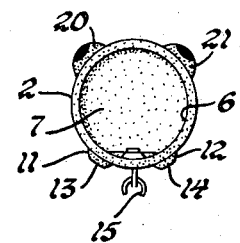
FIG. 2 is a front view, taken in the direction of the arrows 2—2 in FIG. 1.

Referring now in detail to the drawing, and first to FIG. 1, a fish lure of the plug type is shown, incorporating a body 1 molded of light refracting and transmitting plastic material such as transparent or translucent "Plexiglass". The body is of elongated tubular shape, open at its forward end (FIG. 2), and having generally smoothly curved inner and outer sidewall surfaces 2 and 3. The sidewalls may taper inwardly toward the rear end as shown at 4, and adjacent the rear end is an end wall 5 which is preferably molded integrally with the sidewalls of the body. This end wall 5 may or may not be perforated, as desired. A slight counter bore of the side walls may be formed in the forward portion of the body, as indicated at 6, to provide a shoulder for seating a transverse plate or disc 7. This disc may or may not be perforated, as desired, but is located rearwardly of the forward end of the body as shown in FIG. 1. It thus functions as a transverse wall defining the rearward extremity of a forwardly open chamber 8 at the front end of the body. The front and rear ends of the body terminate in front and rear end faces 9 and 10 which are obliquely disposed to the curved external and internal surfaces of the body sidewalls. The smoothly curved external surfaces of the body are also interrupted along the bottom thereof by a pair of ribs 11 and 12 which extend substantially the full length of the body. These ribs present obliquely disposed surfaces 13 and 14 facing downwardly at angles of approximately 30 degrees from vertical.

On the underside of the body, and adjacent its forward end, is a swivel connection 15 to a fish line 16, used for pulling the lure through the water. During such forward motion, water entering the chamber 8 tends to entrap air therein and create a turbulence. With the transverse wall 7 and rear end wall 5 formed without perforations (as shown) the internal chamber 17 therebetween may be made air-tight so that the lure has buoyancy to float on or near the surface of the water. Jerking movements of the line 16 will thus cause the lure to bob upwardly at its forward end, allowing some of the air trapped in the forward chamber 8 to escape as bubbles and thereby aid the attraction of fish to strike.

Making the interior and exterior surfaces of the lure body uniformly smoothly curved, except for the faces 9, 10, 13 and 14, results in substantially all extraneous light entering the body to be efficiently absorbed by the sidewalls and transmitted in concentrated form for emission from those faces with greatly intensified brilliance. The longitudinally extending rib faces 13 and 14 serve the important function in this respect of providing a linear dimension to the emitted light, simulating a swimming fish.

Secured to a bracket 18 extending rearwardly from the lower rear end of the body is a fish hook 19 of conventional form. The internal chamber 17 encloses a rollable ball 22, acting as a noise-making "knocker" element, having freedom of motion between the disc 7 and rear wall 5. A press fit of the disc within the counter bore 6 or the use of a suitable adhesive therefor serves to anchor it against the striking force of the ball 22. The simulation in appearance of the lure to that of a fish may be further enhanced by attaching a pair of "eyes" 20 and 21 to the upper forward exterior of the body.

Figure 3:
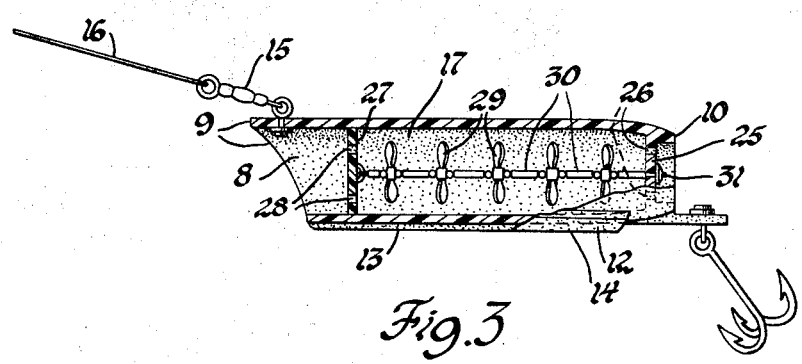
FIG. 3 is a view similar to FIG. 1 but showing a modified form of the invention.

The modified form of the lure as shown in FIG. 3 is designed to operate below the surface of the water. It includes a body identical to that previously described except that the swivel 15 for attaching the fish line 16 is connected to the upper instead of the lower forward end of the body, and the rear end wall 25 is provided with perforations 26. Also, instead of a knocker ball, the internal chamber 17 encloses a series of spinners 29 strung between spacers 30 on a wirelike shaft 31 interconnecting the rear end wall 25 and the disc 27. Perforations 28 are also provided in the disc 27, and these and the perforations 26 allow water to flow through the chamber 17 during forward motion of the lure, causing the spinners 29 to rotate. These spinners preferably have a highly reflective surface, whereby such light as may pass radially through the wall of the body is reflected back by the spinners to produce a flashing aura of light visible externally of the lure. It will be understood that the lure body of this modification retains the same front and rear end faces 9 and 10 and rib faces 13 and 14 as that of the lure of FIG. 1.

Figure 4:
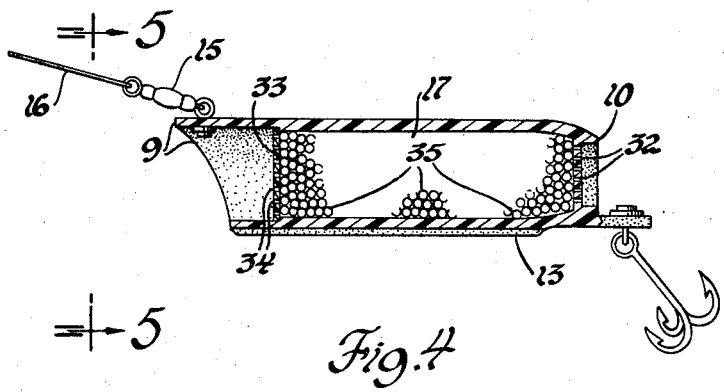
FIG. 4 is a view also similar to FIGS. 1 and 3 but showing a further modification of the invention.
Figure 5:
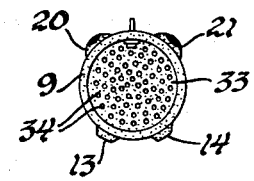
FIG. 5 is a front view, taken in the direction of the arrows 5—5 of FIG. 4.

The modification shown in FIG. 4 differs further only in that the internal chamber 17 serves as an enclosure for a quantity of salmon eggs 35, instead of a knocker element or spinners. Such salmon eggs are of the order of approximately ⅛ inch diameter, which is somewhat larger than the perforations 32 and 34 in the rear wall and disc 33, and as water flows therethrough during retrieval of the lure a trail of salmon egg oil is discharged as a further attraction to fish. It will be appreciated that this embodiment also retains the smoothly curved external surfaces and internal surfaces of the body, together with the oblique end faces 9 and 10 and rib faces 13 and 14.

In each of the forms of my invention as described the plastic material of the body is preferably of a pastel color such as pale red, blue, green, etc. The configuration of the body, being of relatively simple tubular shape, with a slight rearward draft, is adapted for inexpensive molding techniques, and the addition of the transverse disc 7, 27 or 33 serves to provide both the forwardly open chamber 8 at the front end as well as the internal chamber 17 which is conveniently adapted for enclosure of the knocker element 22, spinners 29 or the salmon eggs 35. Thus, using the same basic mold, except for the choice of making the end wall 5 imperforate, or providing perforations 26, 32 therein, and the selection of an imperforate disc 7 or perforated disc 27, 33 the lure may be manufactured and sold for use in either of the three forms shown and described.

Although the description of this invention has been given with reference to three specific embodiments, it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. A fish lure comprising an elongated hollow body of light refracting plastic material having smoothly curved light transmitting sidewalls, said sidewalls terminating circumferentially of the body in a radially outwardly facing rib face extending longitudinally of the body, said sidewalls also terminating at one end of the body in a generally radially extending end face, said rib and end faces each being disposed at an oblique angle to the adjacent curved surfaces of said sidewalls and of relatively narrow width, whereby light rays entering said body are refracted and transmitted through the sidewalls thereof to said rib and end faces and emitted therefrom with intensified brilliance.

2. The invention of claim 1, wherein said rib face is duplicated by a second, parallel rib face extending longitudinally of the body, said rib faces being located adjacent the bottom of the body and spaced from each other, whereby the light rays emitted therefrom are directed downwardly and laterally of the lure.

3. The invention of claim 1, wherein said end face is located at the rear of the body and, said curved sidewalls also terminate forwardly in an oblique front face, whereby a portion of said refracted light rays is transmitted to and emitted from said front face.

4. The invention of claim 3, including a chamber disposed in the forward end of the body, the entrance to said chamber being defined by said body front face, a transverse wall extending radially inward from said curved sidewalls and spaced rearwardly of the body from said front face to define the rearward extremity of said chamber, said front face being inclined generally forwardly and upwardly relative to the transverse wall and means for connecting a fish line to the lower portion of the body adjacent its forward end, whereby the lure tends to undergo an upwardly bobbing motion pursuant to being drawn forwardly through the water at an accelerated rate.

5. The invention of claim 4, including a rear wall adjacent said end face, said transverse and rear walls defining an internal chamber within the body, and a knocker element within said internal chamber and having freedom of motion to move into alternate striking abutment with said transverse wall and rear wall in response to accelerating and decelerating forward motions of the lure in operation.

6. The invention of claim 4, including a rear wall adjacent said end face, said transverse and rear walls having perforations accommodating flow of water through the body, and spinner means within the body including a shaft extending between said transverse and rear walls and a light reflecting spinner element rotatable upon said shaft in response to flow of water through the body.

7. The invention of claim 4, including a rear wall adjacent said end face, said transverse and rear walls having perforations accommodating flow of water through the body, and a quantity of salmon eggs disposed within the body between said transverse and rear walls, whereby a trail of salmon egg oil is discharged from the lure as the body is drawn through the water in operation.

8. The invention of claim 2, wherein said end face is located at the rear of the body and said curved sidewalls also terminate forwardly in an oblique front face, whereby a portion of said refracted light rays is also transmitted to and emitted from said front face.

9. The invention of claim 3, wherein a second rib face extends longitudinally of the body, generally parallel with said first named rib face, said rib faces being located adjacent the bottom of the body and spaced circumferentially of the body from each other, whereby the light rays emitted therefrom are directed downwardly and laterally of the lure.

* * * * *